United States Patent
Castro Do Amaral et al.

(10) Patent No.: US 9,917,637 B1
(45) Date of Patent: Mar. 13, 2018

(54) METHOD AND DEVICE FOR IN-SERVICE MONITORING OF OPTICAL FIBRES

(71) Applicant: Telefonaktiebolaget LM Ericsson (publ), Stockholm (SE)

(72) Inventors: Gustavo Castro Do Amaral, Rio de Janeiro (BR); Diego Rodrigo Villafani Caballero, Rio de Janeiro (BR); Luis Ernesto Ynoquio Herrera, Rio de Janeiro (BR); Jean Pierre Von Der Weid, Rio de Janeiro (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 111 days.

(21) Appl. No.: 15/109,617

(22) PCT Filed: Apr. 21, 2016

(86) PCT No.: PCT/SE2016/050348
§ 371 (c)(1),
(2) Date: Jul. 1, 2016

(87) PCT Pub. No.: WO2017/184044
PCT Pub. Date: Oct. 26, 2017

(51) Int. Cl.
*H04B 10/071* (2013.01)
*H04B 10/077* (2013.01)
*H04B 10/516* (2013.01)

(52) U.S. Cl.
CPC ....... *H04B 10/071* (2013.01); *H04B 10/0773* (2013.01); *H04B 10/0775* (2013.01); *H04B 10/516* (2013.01)

(58) Field of Classification Search
CPC .............. H04B 10/071; H04B 10/0773; H04B 10/0775; H04B 10/516
See application file for complete search history.

(56) References Cited

U.S. PATENT DOCUMENTS

| | | | |
|---|---|---|---|
| 7,428,382 | B2 | 9/2008 | Soto et al. |
| 2014/0133847 | A1* | 5/2014 | Vall-Llosera ...... G01M 11/3127 398/21 |

(Continued)

FOREIGN PATENT DOCUMENTS

WO 2015133939 A1 9/2015

OTHER PUBLICATIONS

"Optical fibre cable maintenance criteria for in-service fibre testing in access networks; Series L: Construction, Installation and Protection of Cables and Other Elements of Outside Plant, ITU-T Recommendation L.66," May 2007, 20 pages, ITU-T Telecommunication Standardization Sector of ITU.

(Continued)

*Primary Examiner* — Leslie C Pascal
(74) *Attorney, Agent, or Firm* — Nicholson De Vos Webster & Elliott LLP (57) ABSTRACT

Methods, optical transmitters and a system of optical transmitters for transmitting data over and monitoring a fiber cable. A method performed by an optical transmitter for transmitting data over and monitoring of a fiber cable comprises generating at least a first optical carrier and a second optical carrier at a same optical frequency, generating an electromagnetic monitoring signal, modulating the first optical carrier with the generated electromagnetic monitoring data signal to create an optical monitoring signal, and modulating the second optical carrier with a generated electromagnetic data signal to create an optical data signal. The method further comprises combining the optical monitoring signal and the optical data signal in orthogonal polarization modes, transmitting the combined optical monitoring signal and the optical data signal over the fiber cable to be monitored, and monitoring the fiber cable by detecting (Continued)

the optical monitoring signal being backscattered from the fiber cable.

21 Claims, 10 Drawing Sheets

(56) References Cited

U.S. PATENT DOCUMENTS

2016/0277101 A1* 9/2016 Jiang .................. H04B 10/0775
2017/0111111 A1* 4/2017 Urban ................ H04B 10/0775

OTHER PUBLICATIONS

D. Villafani Caballero et al., "SCM/WDM-PON with in-service baseband embedded OTDR monitoring," 2015, pp. 250-255, Optics Communications 356, Elsevier B.V.
International Search Report and Written Opinion dated Dec. 21, 2016, Application No. PCT/SE2016/050348, 11 pages.

* cited by examiner

METHOD AND DEVICE FOR IN-SERVICE MONITORING OF OPTICAL FIBRES

CROSS-REFERENCE TO RELATED APPLICATIONS

This application is a National stage of International Application No. PCT/SE2016/050348, filed Apr. 21, 2016, which is hereby incorporated by reference.

TECHNICAL FIELD

The invention relates to methods, optical transmitters and a system of optical transmitters for transmitting data over and monitoring a fibre cable.

BACKGROUND

An Optical Time Domain Reflectometer (OTDR) is commonly used to monitor and detect faults in an optical fibre system. Conventional solutions are divided into two broad categories.

The first category uses the OTDR while normal data communication on the network is operational; this is called "in-service monitoring". The second category uses the OTDR while normal data communication on the network is non-operational; this is called "out-of-service monitoring". In order to achieve in-service monitoring, data traffic should not be disrupted at any time, which requires the use of multiplexing methods ensuring that data and monitoring signals are not interfering with each other.

A conventional solution based on Wavelength Division Multiplexing (WDM) schemes performs in-service OTDR monitoring and is recommended by International Telegraph Union (ITU) in ITU-TL.313: Optical fibre cable maintenance criteria for in-service fibre testing in access networks. In this recommendation, an ultra-long wavelength (U-band) of 1650 nm is used for monitoring and maintenance of the optical fibre network. This maintenance band is reserved in different standards such as G.983.3 (PON, "Passive Optical Network") and G.694.2 (CWDM, "Coarse WDM") since they do not interfere with communication bands.

However, this technique is performed out-of-band and requires external equipment in order to monitor the optical fibre network, increasing the total cost and adding complexity to the network. An alternative technique is Time Division Multiplexing (TDM), which multiplexes the data signals with OTDR signals in the time domain.

In U.S. Pat. No. 7,428,382, use is made of protocols to ensure that OTDR signals and data signals will be sent at different times, avoiding the need for a separate equipment to monitor the optical fibre network and using the same wavelength as the data signals. Nevertheless, this technique is not capable of performing fibre monitoring at the same time data is transmitted, which is a desirable feature in an optical transmission system.

Another multiplexing technique used to perform in-service monitoring is known as subcarrier multiplexing (SCM), discussed for instance in J. P. von der Weid, et al., "SCM/WDM-PON with in-service baseband embedded OTDR monitoring", Optics Communications, Volume 356, 1 Dec. 2015, Pages 250-255, ISSN 0030-4018.

In this technique, subcarriers are dedicated to data transmission and the baseband is reserved to perform monitoring of the optical fibre network. On the other hand, this system has Dynamic Range (DR) limitations in the OTDR trace when multiplexing is performed in the electrical domain. Moreover, coherence interference will appear as a noise for the data signal when multiplexing is performed in the optical domain.

Existing solutions for multiplexing OTDR and data signals present different problems among the optical transmission and monitoring systems. In WDM multiplexing, the cost related to external equipment that perform monitoring is usually rather high; consequently, this equipment is typically shared among several WDM channels precluding the possibility to perform monitoring of individual channels at the same time. Furthermore, the use of different wavelengths to perform monitoring reduces the available spectrum for data channels, which is an important concern for data transmission systems where data rate is ever increasing.

In the case of TDM techniques, monitoring of the optical network cannot be performed simultaneously with data transmission, which could cause long waiting times in a busy network to perform monitoring. Furthermore, monitoring of the fibre network interferes with normal data transmission. In the case of SCM techniques, a high DR is difficult to achieve without degrading the data signal. In this regard, data and OTDR modulation indexes should not exceed the linear region of the modulator in order to achieve negligible impact on data transmission. An alternative is the use of different optical modulators to generate the data and OTDR signals. In this configuration, coherent interference will degrade the data signal quality.

SUMMARY

An object of the present invention is to solve, or at least mitigate, this problem in the art and to provide an improved optical transmitter and method for in-service monitoring of an optical fibre cable.

This object is attained in a first aspect of the invention by a method performed by an optical transmitter for transmitting data over and monitoring of a fibre cable with a single optical frequency. The method comprises generating at least a first optical carrier and a second optical carrier at a same optical frequency, generating an electromagnetic monitoring signal, modulating the first optical carrier with the generated electromagnetic monitoring data signal to create an optical monitoring signal, and modulating the second optical carrier with a generated electromagnetic data signal to create an optical data signal. The method further comprises combining the optical monitoring signal and the optical data signal in orthogonal polarization modes, transmitting the combined optical monitoring signal and the optical data signal over the fibre cable to be monitored, and monitoring the fibre cable by detecting the optical monitoring signal being backscattered from the fibre cable.

This object is attained in a second aspect of the invention by an optical transmitter configured to transmit data over and monitor a fibre cable with a single optical frequency. The optical transmitter comprises an optical source arrangement configured to generate at least a first optical carrier and a second optical carrier at a same optical frequency, a generator configured to generate an electromagnetic monitoring signal, a first modulator configured to modulate the first optical carrier with the generated electromagnetic monitoring data signal to create an optical monitoring signal, a second modulator configured to modulate the second optical carrier with a generated electromagnetic data signal to create an optical data signal, and a combiner configured to combine the optical monitoring signal and the optical data signal in orthogonal polarization modes. The optical transmitter further comprises a circulator configured to receive the combined optical monitoring signal and the optical data signal on a first port and to transmit, via a second port, the combined optical monitoring signal and the optical data signal over the fibre cable to be monitored, the circulator further being configured to receive the optical monitoring signal being backscattered from the fibre cable on the second port for transmission to a third port, and an optical detector configured to receive the backscattered signal via the third port of the circulator for monitoring the fibre cable.

This object is attained in a third aspect of the invention by an optical transmitter configured to transmit data over and monitor a fibre cable with a single optical frequency. The optical transmitter comprises an optical source arrangement configured to generate at least a first optical carrier and a second optical carrier at a same optical frequency, a generator configured to generate an electromagnetic monitoring signal, a first modulator configured to modulate the first optical carrier with the generated electromagnetic monitoring data signal to create an optical monitoring signal, a second modulator configured to modulate the second optical carrier with a generated electromagnetic data signal to create an optical data signal, and a circulator configured to receive the optical monitoring signal on a first port and to forward the optical monitoring signal via a second port. The optical transmitter further comprises a combiner configured to combine the optical monitoring signal received from the second port of the circulator and the optical data signal in orthogonal polarization modes, and to transmit the combined optical monitoring signal and the optical data signal over the fibre cable to be monitored, the combiner further being configured to receive the optical monitoring signal being backscattered from the fibre cable, wherein the circulator further is configured to receive from the combiner, on the second port, the optical monitoring signal being backscattered from the fibre cable for transmission to a third port. The optical transmitter further comprises an optical detector configured to receive the backscattered signal via the third port of the circulator for monitoring the fibre cable.

This object is attained in a fourth aspect of the invention by a system of optical transmitters, each being configured to transmit data over a respective fibre cable, the system further being configured to monitor each respective fibre cable with a single optical frequency. The system comprises a cable monitoring device comprising a tuneable optical source configured to generate an optical carrier, a generator configured to generate an electromagnetic monitoring signal, a modulator configured to modulate the first optical carrier with the generated electromagnetic monitoring data signal to create an optical monitoring signal, and a circulator configured to receive the optical monitoring signal on a first port and to forward the optical monitoring signal via a second port, and further to receive the optical monitoring signal being backscattered from any of the fibre cables on the second port for transmission to a third port. The cable monitoring device further comprises an optical detector configured to receive the backscattered signal via the third port of the circulator for monitoring the fibre cable, and an optical switch configured to receive the optical monitoring signal via a second port of the circulator, and to forward the received optical monitoring signal to each of the optical transmitters, and further to receive the backscattered signal from each of the optical transmitters for transmission to the optical detector via the second and third port of the circulator. Further, each optical transmitter of the system comprises an optical source configured to generate an optical carrier, a modulator configured to modulate the optical carrier with a generated electromagnetic data signal to create an optical data signal, and a combiner configured to receive, from the optical switch of the cable monitoring device, the optical monitoring signal, to combine the optical monitoring signal and the optical data signal in orthogonal polarization modes, to transmit the combined optical monitoring signal and the optical data signal over the fibre cable to be monitored, the combiner further being configured to receive the optical monitoring signal being backscattered from the fibre cable and forward the backscattered signal to the optical switch of the cable monitoring device.

The optical transmitter, method and system of optical transmitters according to embodiments, providing in-service monitoring of one or more optical fibres, have several advantages.

Firstly, different optical modulators are advantageously utilized (a) to generate an optical monitoring signal by modulating a first optical carrier with a first electromagnetic monitoring signal, and (b) to generate an optical data signal by modulating a second optical carrier with a first electromagnetic data signal, which optical monitoring signal subsequently is backscattered from the optical cable and detected to determine a fault occurrence, its position and corresponding loss intensity, while optical data signal carries payload data. By using different optical modulators, sharing of modulation index between the optical monitoring signal and the optical data signal is avoided.

Secondly, after having generated the optical monitoring signal and the optical data signal, the two signals are advantageously combined in an orthogonal polarization-combiner for combining the optical data signal and the optical monitoring signal in orthogonal polarization modes, thereby avoiding coherent interference, which degrades data signal quality.

Thirdly, because there is no share of modulation index the power of the optical monitoring signal can be chosen independently of the power of the optical data signal, and thus the Dynamic Range of the optical monitoring signal is advantageously increased without affecting the optical data signal quality.

Further, with the provided system of optical transmitters, a cable monitoring device is advantageously shared among a plurality of optical transmitters by means of an optical switch and a tuneable optical source, the tuneable optical source being tuned to an optical frequency of the optical transmitter to which it currently is switched. Hence, a great number of components required for monitoring the optical fibre can be shared among the plurality of optical transmitters, thereby omitting the need to equip each one of the optical transmitters with these components.

In an embodiment, a single optical carrier is generated and passed trough an optical splitter to split the single optical carrier into the first optical carrier and the second optical carrier. This is advantageous since a single generator can be used for the optical carrier, which reduces cost, and the same optical carrier can be reused for generating the optical data and monitoring signals.

In a further embodiment, the optical transmitter(s) comprises a selector configured to extract the backscattered signal from a signal received via the fibre cable for forwarding to the optical detector for monitoring of the optical fibre, and to extract, from the signal received via the fibre cable, a data signal submitted by a remote optical transmitter connected to the fibre cable. By further equipping the optical transmitter with a receiver configured to receive the extracted data submitted by the remote optical transmitter connected to the optical fibre, the function of the transmitter will advantageously be extended to encompass that of a transceiver.

In yet a further embodiment the electromagnetic monitoring signal is generated at a first frequency, while the at least one electromagnetic data signal is generated and shifted to a second frequency different from the first frequency, wherein the frequency-shifted at least one electromagnetic data signal is utilized to modulate the second optical carrier to create the optical data signal. It is noted that the at least one electromagnetic data signal may be generated and frequency-shifted on-board of the optical transmitter, or generated externally and supplied to the optical transmitter.

In still an embodiment, the monitoring of the fibre cable further comprises comparing the detected backscattered signal with a theoretical representation of the backscattered signal, wherein at least one location along the fibre cable link where the optical monitoring signal is backscattered, and signal loss is determined.

In yet an embodiment, the optical transmitter(s) further comprises a polarisation scrambler arranged at an output and configured to perform polarisation scrambling on the signals to be transmitted over the fibre cable.

In still another embodiment, the comparing of the detected backscattered signal with a theoretical representation of the backscattered signal comprises the steps of fitting a waveform of the detected backscattered signal to a waveform of the theoretical representation of the backscattered signal, and determining the (at least one location) of the backscattering and signal loss from a best fit.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
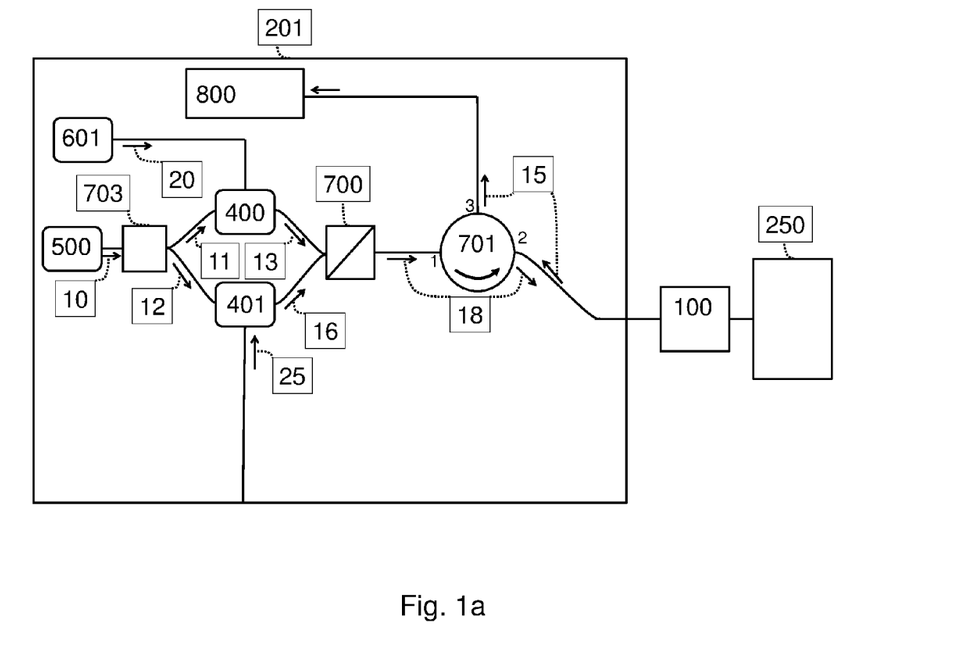
FIG. 1a shows an optical transmitter according to an embodiment.

FIG. 1a shows an optical transmitter 201 for in-service monitoring of an optical fibre 100, i.e. simultaneous transmission of data over—and monitoring of—the optical fibre, for determining properties of the fibre such as locating faults and/or measuring loss of the cable according to an embodiment. In the following, "optical fibre, "optical fibre cable" and "fibre cable" will alternatingly be used for denoting the same element.

FIG. 1a shows the optical transmitter 201 according to the embodiment being connectable to a remote transceiver 250 by the fibre cable 100, and being adapted for monitoring the fibre cable with a single optical source 500 generating an optical carrier 10.

The generated optical carrier 10 is divided by an optical power splitter 703 resulting in generation of a first optical carrier 11 and a second optical carrier 12. The two carriers have the same optical frequency, but different properties distinguish the carriers, such as different spatial modes, polarization and optical power.

The optical transmitter 201 further comprises an electromagnetic monitoring signal generator 601 providing an electromagnetic monitoring signal 20, and further comprises a first modulator 400 adapted to modulate the first optical carrier 11 with the generated electromagnetic monitoring signal 20, for example at baseband, thereby generating an optical monitoring signal 13.

In this embodiment, the optical transmitter 201 further receives an electromagnetic data signal 25, which is used by a second modulator 401 to modulate the second optical carrier 12 thereby generating an optical data signal 16. The electromagnetic data signal 25 may be at a substantially higher frequency than that of the electromagnetic monitoring signal 20 used at the first modulator 400 for modulating the first optical carrier 11 (which is exemplified as a baseband signal) for instance at radio frequency (RF). However, in a general scenario, the electromagnetic monitoring signal 20 is generated at a first frequency, while the electromagnetic data signal 25 is generated at a second frequency being different than the first frequency, either higher or lower.

The optical power of the source 500 and splitting ratio of the power splitter 703 are chosen to provide for the needs of each carrier, according to desired signal to noise ratio requirements for data transmission and monitoring. For example the splitting can be 90% for the monitoring carrier and 10% for the data transmission carrier, but any proportion can be used according to the available power of the source 500.

The optical transmitter 201 further comprises an orthogonal polarization combiner 700 for combining the optical data signal 16 and the optical monitoring signal 13 in orthogonal polarization modes.

Moreover, the optical transmitter 201 further comprises an optical circulator 701 for transmitting, from port 1 to port 2, the combined optical monitoring and data signal 18 over the optical cable 100 towards the remote transceiver 250. Any backscattered signal 15 from the optical fibre cable 100 will enter port 2 of the optical circulator 701 and exit port 3, thereby being supplied to an optical detector 800 of the optical transmitter 201 for receiving and processing the backscattered signal 15 in order to determine fault of the fibre cable 100. The optical detector 800 is typically combined with a processing device such as a microprocessor for processing the detected optical backscattered signal 15.

The detected backscattered signal 15 from the monitored fibre cable 100 is given by the sum of scattered signals along every section of the monitored fibre guided back as well as reflections that may occur, for example at the end of the fibre cable 100 towards the remote transceiver 250 or at a break in the cable occurring earlier as a result of faults or existing mends. The backscattered signal 15 is compared to a theoretical representation of the backscattered signal and by using known methods, a fault occurrence, its position and corresponding loss intensity can be detected, for instance using a so called best fit approach, where a waveform of the measured and theoretical backscattered signal, respectively, are compared in order to find a match.

As an example, a Least Mean Square (LMS) fitting algorithm can be utilized, where measured amplitude and phase of the backscattered signal 15 are fitted with the theoretically acquired amplitude and phase using an LMS algorithm. The LMS algorithm fits the measured backscattered monitoring signal 15 and the theoretical backscattered monitoring signal using the position and loss of a new fault as fitting variables, and a best fit is subsequently selected. It should be noted that the use of the LMS algorithm is an example, and any appropriate fitting algorithm using any appropriate fitting criterion can be envisaged, such as for instance an absolute value mean deviation, fourth power mean deviation or any weighted mean deviation method, etc.

In practice, the signal-processing module included with the optical detector 800 may be embodied e.g. in the form of a microprocessor executing an appropriate computer program, a digital signal processor (DSP), an application specific integrated circuit (ASIC), a field-programmable gate array (FPGA), a complex programmable logic device (CPLD), etc.

Figure 1B:
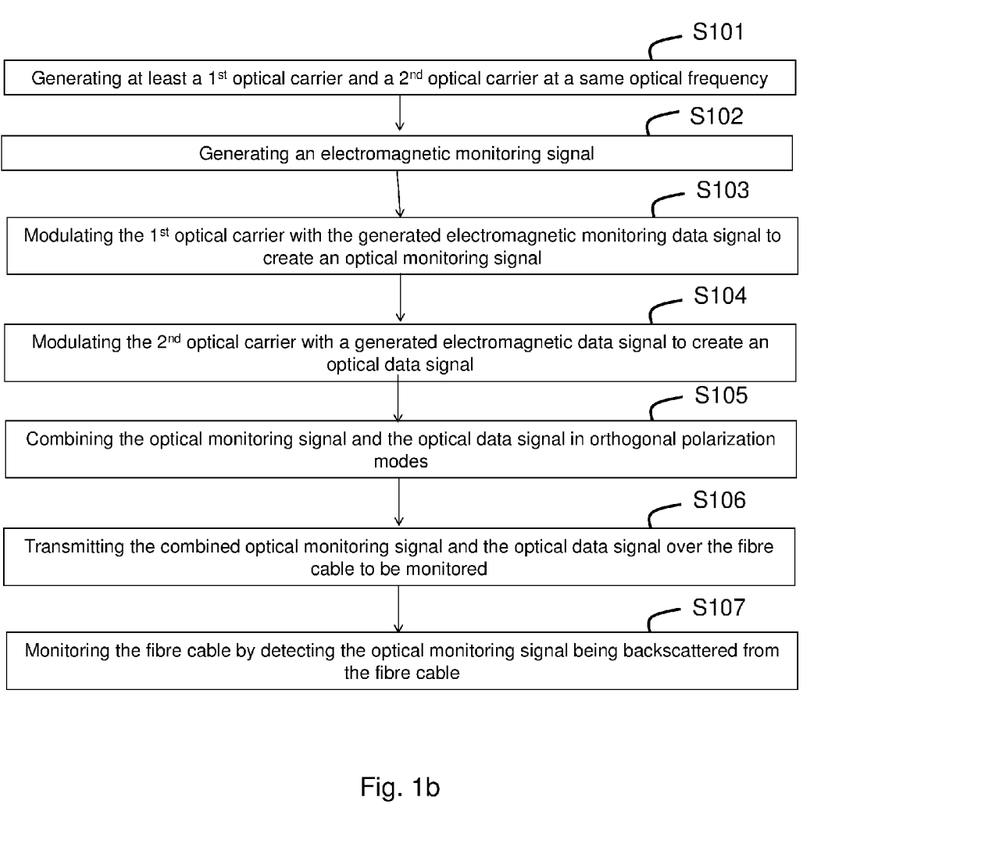
FIG. 1b shows a flowchart of a method according to an embodiment.

FIG. 1*b* illustrates a flowchart over an embodiment of a method for transmitting data over and monitoring of a fibre cable with a single optical frequency. Reference is further made to FIG. 1*a*. Hence, in a first step S101, at least a first optical carrier 11 and a second optical carrier 12 is generated at a same optical frequency. In step s102, an electromagnetic monitoring signal 20 is generated, and in step S103 the first optical carrier 11 is modulated with the generated electromagnetic monitoring data signal 20 to create an optical monitoring signal 13.

Thereafter, in step S104, the second optical carrier 12 is modulated with a generated electromagnetic data signal 25 to create an optical data signal 16, and in step S105, the optical monitoring signal 13 and the optical data signal 16 is combined in orthogonal polarization modes.

Further, in step S106, the combined optical monitoring signal 13 and the optical data signal 16 are transmitted over the fibre cable 100 to be monitored. Finally in step S107, the fibre cable 100 is monitored by detecting the optical monitoring signal 13 being backscattered from the fibre cable 100.

Figure 2:
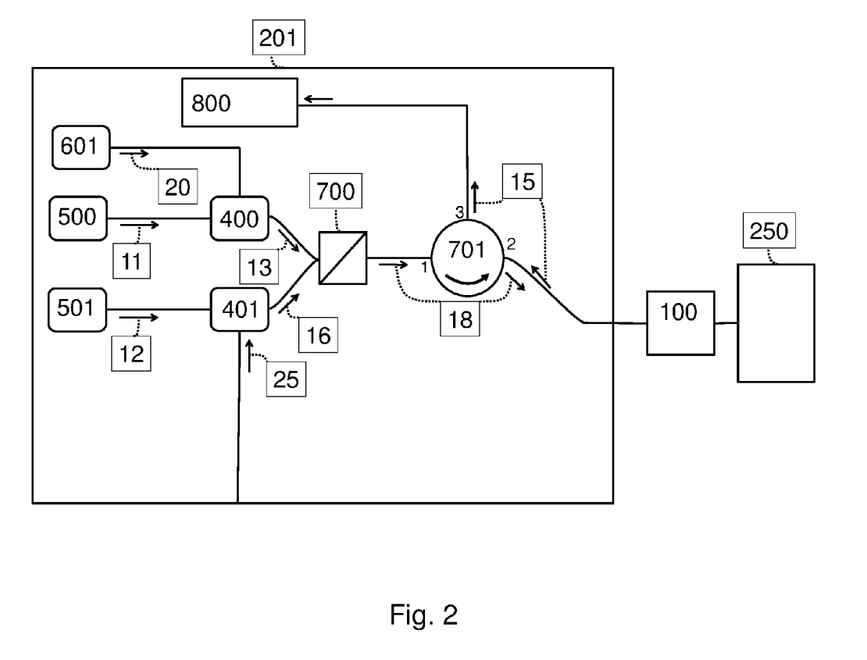
FIG. 2 shows an optical transmitter according to another embodiment.

FIG. 2 shows an alternative embodiment of the optical transmitter 201 illustrated in FIG. 1*a*, where instead of using a single optical source and a splitter, a first optical source 500 is used to generate the first optical carrier 11, while a second optical source 501 is used to generate the second optical carrier 12. Again, the two carriers have the same optical frequency, but different properties distinguish the optical carriers, such as different spatial modes, polarisation and optical power, which can be independently chosen according to the needs for monitoring signal and data signal transmission.

Figure 3A:
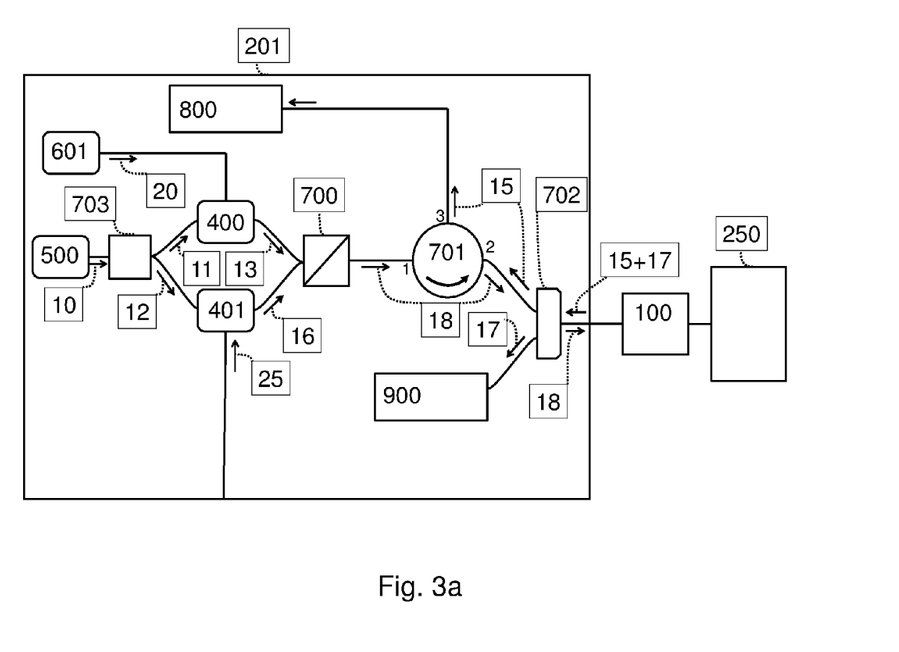
FIG. 3a shows an optical transmitter according to a further embodiment.

FIG. 3*a* shows a further embodiment of the optical transmitter 201. In this particular illustration, a single optical source 500 and a splitter 703 are used. However, the alternative of FIG. 2 can also be envisaged where a first optical source 500 is used to generate the first optical carrier 11, while a second optical source 501 is used to generate the second optical carrier 12.

In this embodiment, the optical transmitter 201 further comprises a selector 702 connected to port 2 of the circulator 701 and configured to separate any backscattered signal 15 originating from the generated optical monitoring signal 13 transmitted over the optical cable 100 from any data signal 17 (i.e. payload data) transmitted by the remote transceiver 250. This is performed by means of wavelength selection; since the optical transmitter 201 and the transceiver 250 uses different wavelengths to transmit optical signals, the respective wavelength can be used at the selector 702 to discriminate the backscattered signal 15 from the payload data signal 17.

The backscattered signal 15 is thus extracted from the signal received via the optical cable 100 at the selector 702 and sent towards port 2 of the circulator 701 and further on to the optical detector and processing module 800 for optical cable monitoring, while the payload data signal 17 is extracted and sent towards a receiver 900 configured to receive data signals 17 received over the optical cable 100 from the remote transceiver 250.

Hence, by including the selector 702 and the receiver 900 in the optical transmitter 201, the function of the transmitter will in fact be extended to encompass that of a transceiver.

Figure 3B:
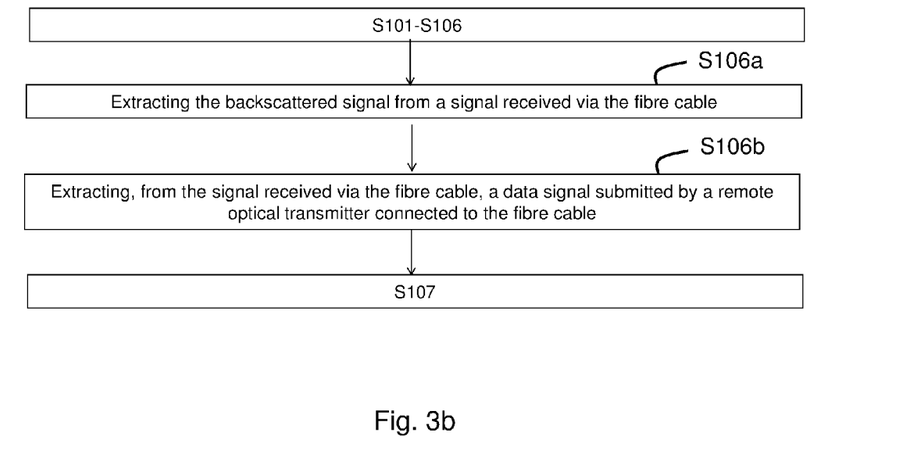
FIG. 3b shows a flowchart of a method according to a further embodiment.

FIG. 3*b* illustrates a flowchart over an embodiment of a method for transmitting data over and monitoring of a fibre cable with a single optical frequency. Reference is further made to FIG. 3*a*. In the embodiment of FIG. 3*b*, steps S101-S106 are performed similar to FIG. 1*b*. However, after having transmitted the combined optical monitoring signal 13 and the optical data signal 16 over the fibre cable 100 to be monitored in step S106, the backscattered signal 15 originating from the optical monitoring signal is extracted from a signal received via the fibre cable by means of wavelength selection in step S106*a*.

Thereafter, in step S106*b*, a data signal 17 submitted by a remote optical transmitter connected to the fibre cable is extracted from the signal received via the fibre cable by means of wavelength selection.

Figure 4:
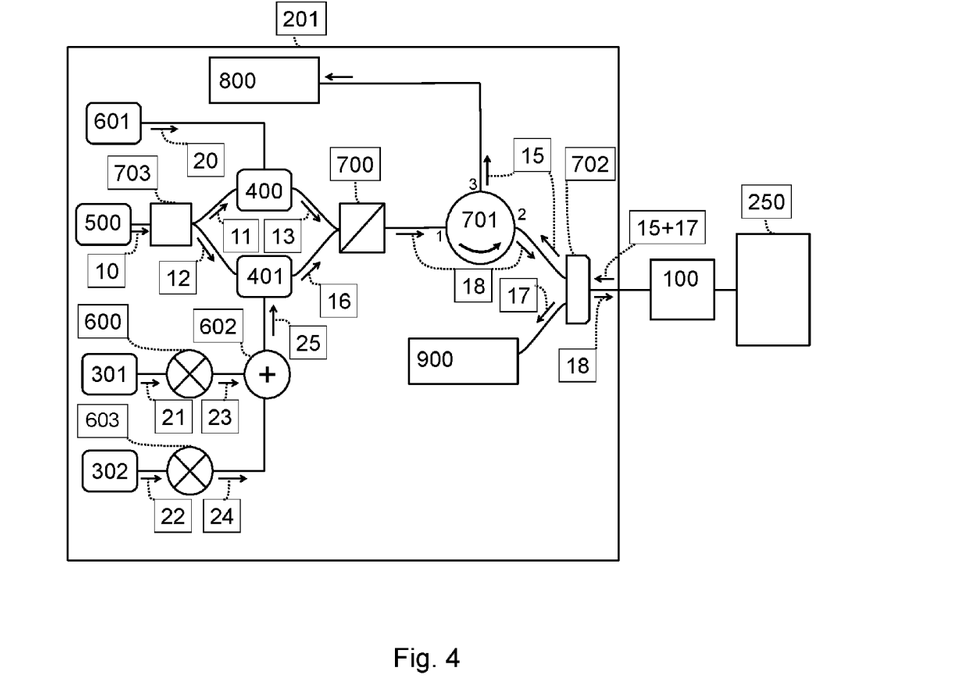
FIG. 4 shows an optical transmitter according to yet a further embodiment.

FIG. 4 illustrates a further embodiment, where the electromagnetic data signal 25 shown throughout FIGS. 1-3 is generated by an arrangement in the optical transmitter/transceiver 201. In such an embodiment, the optical transmitter 201 further comprises at least one electromagnetic data signal generator 301 generating at least one electromagnetic data signal 21 to be transmitted over the fibre cable 100 to the remote transceiver 250.

In this particular illustrating embodiment, the optical transmitter 201 comprises a first electromagnetic data signal generator 301 generating a first electromagnetic data signal 21 and a second electromagnetic data signal generator 302 generating a second electromagnetic data signal 22, which are to be transmitted over the fibre cable 100 to the remote transceiver 250.

Further, the optical transmitter 201 comprises a first frequency shifter 600 and a second frequency shifter 603 for shifting the frequency of the (baseband) first electromagnetic data signal 21 and the second electromagnetic data signal 22, respectively, thereby generating a first frequency-shifted electromagnetic data signal 23 and a second frequency-shifted electromagnetic data signal 24, typically at RF. In this embodiment, the frequency-shifted electromagnetic data signal 23 and the second frequency-shifted electromagnetic data signal 24, is combined in a second combiner 602 and provided as the electromagnetic data signal 25.

Figure 5:
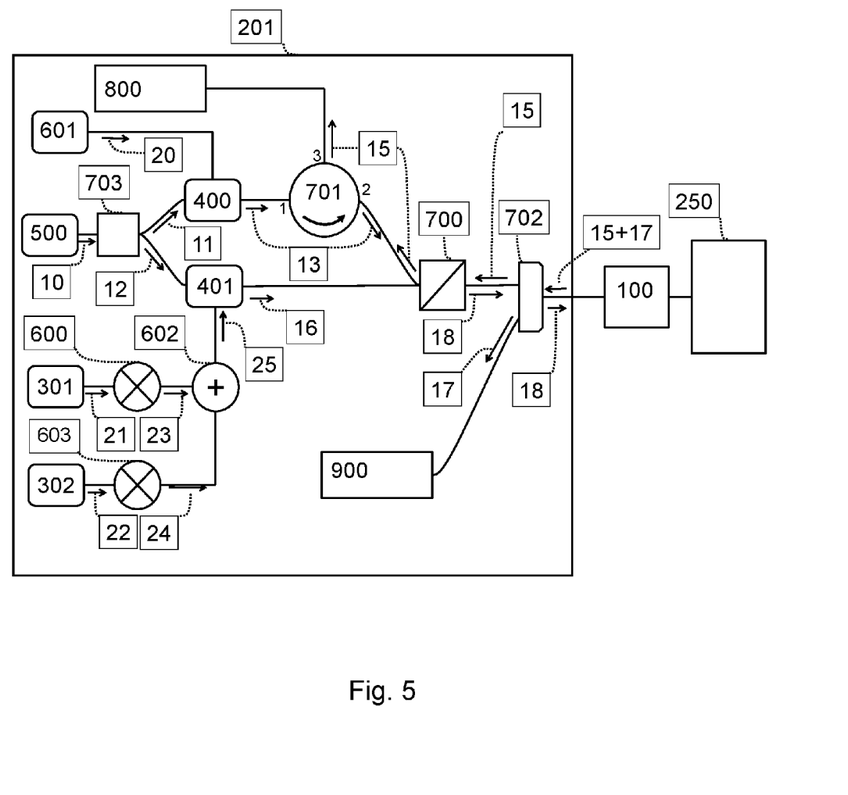
FIG. 5 shows an optical transmitter according to still a further embodiment.

FIG. 5 illustrates yet a further embodiment similar to that shown in FIG. 4, but where the optical monitoring signal 13 output from the first modulator 400 is routed to port 1 of the optical circulator 701, port 2 of which is connected to the orthogonal polarization-combiner 700 for combining the optical data signal 16 and the optical monitoring signal 13 in orthogonal polarization modes to accomplish the combined optical monitoring and data signal 18 at the output of the combiner 700 for submission over the optical cable 100 towards the remote transceiver 250.

Again, any backscattered signal 15 from the optical fibre cable 100 will enter port 2 of the optical circulator 701 and exit port 3, thereby being supplied to the combined optical detector and signal-processing module 800 of the transceiver 201 for receiving and processing the backscattered signal 15 in order to determine position and intensity of a fault of the fibre cable 100.

It is noted that this alternative coupling structure for the orthogonal polarization-combiner 700 and the circulator 701 also may be applied to any one of the embodiments illustrated with reference to FIGS. 1-3.

Figure 6:
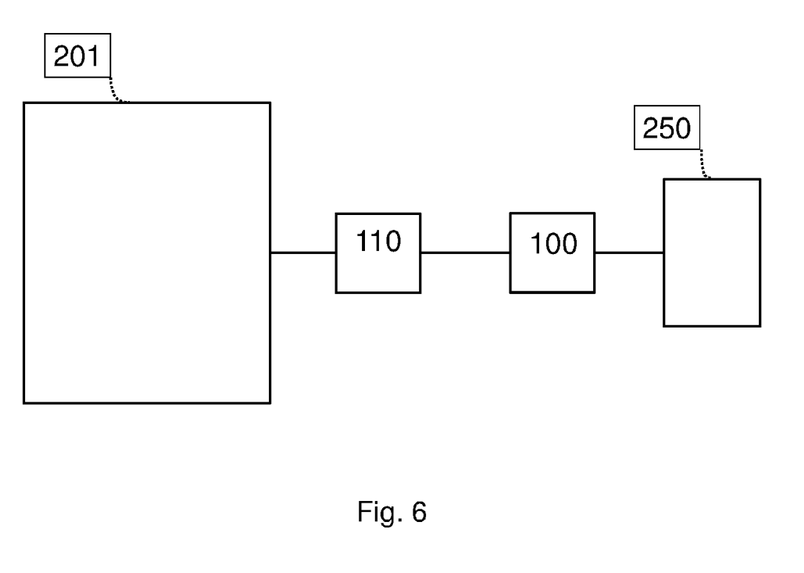
FIG. 6 shows an optical transmitter according to yet another embodiment.

FIG. 6 illustrates yet an embodiment, where the optical transmitter/transceiver 201 of any one of FIGS. 1-5 further comprises a polarisation scrambler 110 arranged at its output to mitigate polarisation effects in the optical monitoring signal 13 before the signal is transmitted over the fibre cable 100.

Figure 7:
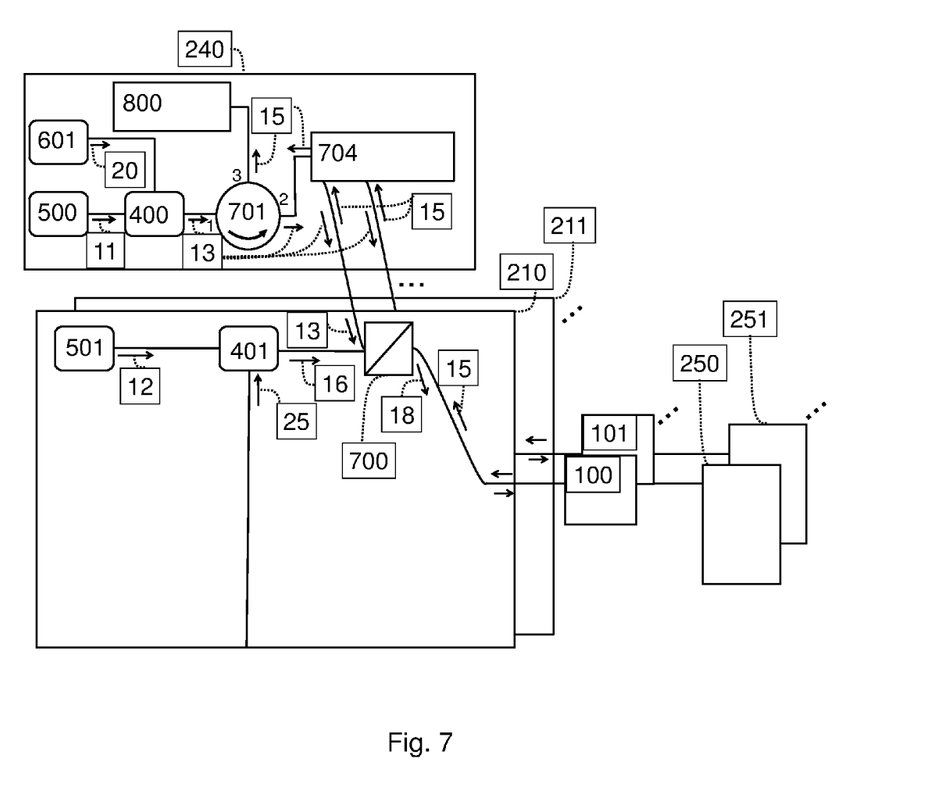
FIG. 7 shows a system of optical transmitters according to an embodiment.

FIG. 7 illustrates still a further embodiment, showing a system where a single cable monitoring device 240 is connected to a plurality of optical transmitters 210, 211 coupled to a respective optical fibre cable 100, 101 for monitoring the cables. Even though two optical transmitters 210, 211 are shown in FIG. 7, a great number of transmitters can be envisaged to be connected to the single cable monitoring device 240, each of which is connected to a cable to be monitored.

The cable monitoring device 240 comprises a tuneable optical source 500 for generating an optical carrier 11 at any desired frequency.

The cable monitoring device 240 further comprises an electromagnetic monitoring signal generator 601 providing an electromagnetic monitoring signal 20, and further comprises a modulator 40000 adapted to modulate the optical carrier 11 with the generated electromagnetic monitoring signal 20, for example at baseband, thereby generating an optical monitoring signal 13.

Moreover, the cable monitoring device 240 comprises an optical circulator 701 for transmitting, from port 1 to port 2, the optical monitoring signal 13 to an optical switch 704.

The optical switch 704 receives the optical monitoring signal 13 via port 2 of the circulator 701 and forwards the received optical monitoring signal 13 to each of the optical transmitters 210, 211 such that the optical monitoring signal 13 subsequently can be submitted on a respective fibre cable 100, 101 connected to each of the optical transmitters 210, 211.

The optical switch 704 further receives any backscattered signal 15 from each of the optical transmitters 210, 211 as a result of the optical monitoring signal 13 being transmitted over the fibre cables 100, 101 and submits the backscattered signal(s) 15 via port 2 and 3 of the circulator 701 to an optical detector and a signal-processing module 800 for receiving and processing the backscattered signal 15 in order to determine fault of the fibre cables 100, 101 from which it backscatters.

Each of the optical transmitters 210, 211 comprises a single optical source 501 generating an optical carrier 12. Since the optical source 500 of the cable monitoring device 240 is tuneable, any frequency can be selected such that the optical monitoring signal 13 switched to the respective optical transmitter 210, 211 via the optical switch 704 is tuned to the frequency of the optical source 501 of the optical transmitter to which the optical monitoring signal 13 is switched. Thus, the optical carrier 11 of the tuneable source 500 can be tuned to have the same frequency as the optical carrier 12 of the transmitter 210, 211 to which it is switched. Again, different properties distinguish the carriers, such as different spatial modes.

Each of the optical transmitters 210, 211 receives an electromagnetic data signal 25, which is used by the modulator 401 to modulate the optical carrier 12 thereby generating an optical data signal 16. As previously discussed, the electromagnetic data signal 25 may be at a substantially higher frequency than that of the electromagnetic monitoring signal 20 used at the modulator 400 for modulating the optical carrier 11. Again, the electromagnetic monitoring signal 20 is generated at a first frequency, while the electromagnetic data signal 25 is generated at a second frequency different than the first frequency.

Each optical transmitter 210, 211 further comprises an orthogonal polarization-combiner 700 for combining the optical data signal 16 and the optical monitoring signal 13 received from the optical switch 704 of the cable monitoring device 240 in orthogonal polarization modes.

The combiner 700 transmits the combined optical monitoring and data signal 18 over the respective optical cable 100, 101 towards a remote transceiver 250, 251. Any backscattered signal 15 from the optical fibre cables 100, 101 will be received by the modulator 700 and transmitted to the optical switch 704 of the cable monitoring device 240, which in its turn subsequently forwards the backscattered signal(s) 15 to port 2 of the optical circulator 701, where it exits at port 3 to the optical detector 800 processing the backscattered signal 15 in order to determine a position where the optical monitoring signal 13 backscatters along the fibre cable 100, 101, as well as intensity of signal loss at the position.

Figure 8:
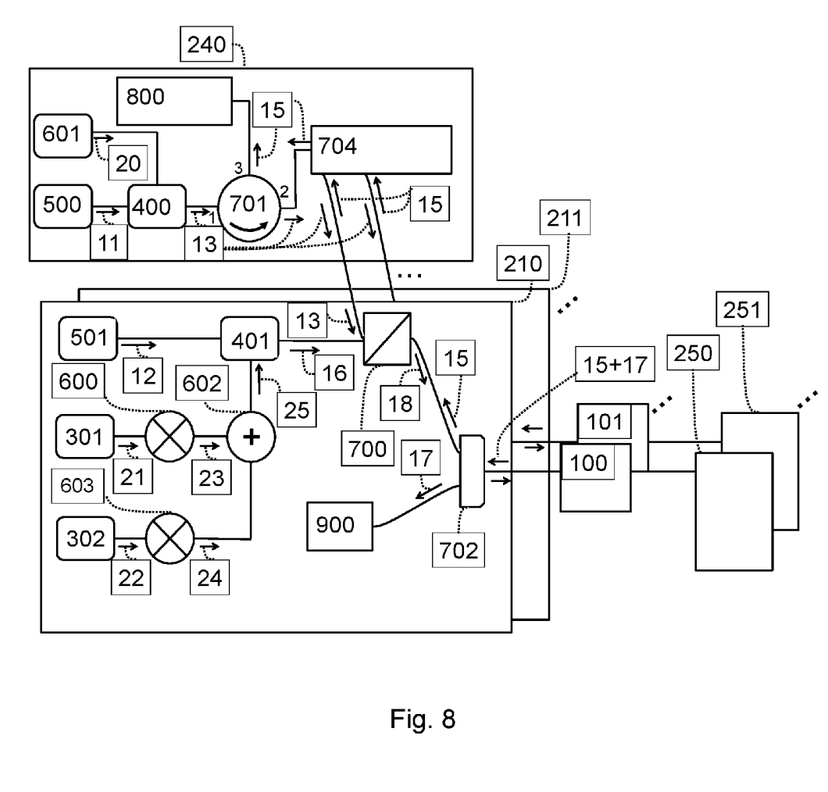
FIG. 8 shows a system of optical transmitters according to another embodiment.

FIG. 8 illustrates an embodiment, where similar to previously described embodiments, each optical transmitter 201 further comprises a selector 702 connected to the modulator 700 configured to separate any backscattered signal 15 originating from the generated optical monitoring signal 13 transmitted over the optical cable 100 from any data signal 17 (i.e. payload data) transmitted by the remote transceiver 250 using wavelength selection.

The backscattered signal 15 is thus extracted from the signal received via the optical cable 100 at the selector 702 and sent towards port 2 of the circulator 701—via the modulator 700 and the optical switch 704—and further on via port 3 to the optical detector and processing module 800 for optical cable monitoring, while the payload data signal 17 is extracted and sent towards a receiver 900 configured to receive data signals 17 received over the optical cable 100, 101 from the remote transceiver 250, 251.

Again, by including the selector 702 and the receiver 900 in the optical transmitter 210, 211, the function of the transmitter will in fact be extended to encompass that of a transceiver.

Further shown in FIG. 8 is the previously discussed first electromagnetic data signal generator 301 generating a first electromagnetic data signal 21 and a second electromagnetic data signal generator 302 generating a second electromagnetic data signal 22, which are to be transmitted over the fibre cables 100, 101 to the remote transceivers 250, 251.

Further, each optical transmitter 210, 211 comprises a first frequency shifter 600 and a second frequency shifter 603 for shifting the frequency of the (baseband) first electromagnetic data signal 21 and the second electromagnetic data signal 22, respectively, thereby generating a first frequency-shifted electromagnetic data signal 23 and a second frequency-shifted electromagnetic data signal 24, typically at RF. In this embodiment, the frequency-shifted electromagnetic data signal 23 and the second frequency-shifted electromagnetic data signal 24, is combined in a combiner 602 and provided as the electromagnetic data signal 25.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by an optical transmitter for transmitting data over and monitoring of a fibre cable with a single optical frequency, the method comprising:
generating at least a first optical carrier and a second optical carrier at a same optical frequency;
generating an electromagnetic monitoring signal;
modulating the first optical carrier with the generated electromagnetic monitoring signal to create an optical monitoring signal;
modulating the second optical carrier with a generated electromagnetic data signal to create an optical data signal;
combining the optical monitoring signal and the optical data signal in orthogonal polarization modes;
transmitting the combined optical monitoring signal and the optical data signal over the fibre cable to be monitored; and
monitoring the fibre cable by detecting the optical monitoring signal being backscattered from the fibre cable.

2. The method of claim 1, wherein generating the first optical carrier and second optical carrier comprises:
generating a single optical carrier; and
splitting the single optical carrier into the first optical carrier and the second optical carrier.

3. The method of claim 1, further comprising:
extracting the backscattered signal from a signal received via the fibre cable; and
extracting, from the signal received via the fibre cable, a data signal submitted by a remote optical transmitter connected to the fibre cable.

4. The method of claim 1, wherein the electromagnetic monitoring signal is generated at a first frequency, the method further comprising:
generating at least one electromagnetic data signal; and
shifting the frequency of the at least one electromagnetic data signal to a second frequency different from the first frequency, wherein the frequency-shifted at least one electromagnetic data signal is utilized to modulate the second optical carrier to create an optical data signal.

5. The method of claim 1, the monitoring of the fibre cable further comprising:
comparing the detected backscattered signal with a theoretical representation of the backscattered signal, wherein at least one location along the fibre cable link where the optical monitoring signal is backscattered, and signal loss is determined.

6. The method of claim 5, wherein the comparing of the detected backscattered signal with a theoretical representation of the backscattered signal comprises:
fitting a waveform of the detected backscattered signal to a waveform of the theoretical representation of the backscattered signal; and
determining said at least one location of the backscattering and signal loss from a best fit.

7. An optical transmitter configured to transmit data over and monitor a fibre cable with a single optical frequency, the transmitter comprising:
an optical source arrangement configured to generate at least a first optical carrier and a second optical carrier at a same optical frequency;
a generator configured to generate an electromagnetic monitoring signal;
a first modulator configured to modulate the first optical carrier with the generated electromagnetic monitoring signal to create an optical monitoring signal;
a second modulator configured to modulate the second optical carrier with a generated electromagnetic data signal to create an optical data signal;
a combiner configured to combine the optical monitoring signal; and the optical data signal in orthogonal polarization modes;
a circulator configured to receive the combined optical monitoring signal and the optical data signal on a first port and to transmit, via a second port, the combined optical monitoring signal and the optical data signal over the fibre cable to be monitored, the circulator further being configured to receive the optical monitoring signal being backscattered from the fibre cable on the second port for transmission to a third port; and
an optical detector configured to receive the backscattered signal via the third port of the circulator for monitoring the fibre cable.

8. The optical transmitter of claim 7, further comprising:
a selector configured to:
extract the backscattered signal from a signal received via the fibre cable for submission to the second port of the circulator; and to
extract, from the signal received via the fibre cable, a data signal submitted by a remote optical transmitter connected to the fibre cable, the optical transmitter further comprising:
a receiver configured to receive the extracted data submitted by the remote optical transmitter connected to the fibre cable.

9. The optical transmitter of claim 7, the optical source arrangement comprising:
a single optical source configured to generate a single optical carrier; and
a splitter configured to split the single optical carrier into the first optical carrier and the second optical carrier.

10. The optical transmitter of claim 7, the optical source arrangement comprising:
a first optical source configured to generate the first optical carrier; and
a second optical source configured to generate the second optical carrier.

11. The optical transmitter of claim 7, wherein the electromagnetic monitoring signal is generated at a first frequency, the optical transmitter further comprising:
- at least one generator configured to generate at least one electromagnetic data signal;
- at least one frequency shifter configured to shift the frequency of the at least one electromagnetic data signal to a second frequency higher than the first frequency, wherein the frequency-shifted at least one electromagnetic data signal is utilized to modulate the second optical carrier to create an optical data signal.

12. The optical transmitter of claim 11, wherein in case two or more electromagnetic data signals are generated and frequency-shifted, the optical transmitter comprises:
- a second combiner configured to combine the two or more frequency-shifted electromagnetic data signals, wherein the combined two or more frequency-shifted electromagnetic data signals is utilized to modulate the second optical carrier to create an optical data signal.

13. The optical transmitter of claim 7, further comprising:
- a polarisation scrambler arranged at an output of the optical transmitter and configured to perform polarisation scrambling on the signals to be transmitted over the fibre cable.

14. The optical transmitter of claim 7, the optical detector further being configured to:
- compare the detected backscattered signal with a theoretical representation of the backscattered signal, wherein at least one location along the fibre cable link where the optical monitoring signal is backscattered, and signal loss is determined.

15. The optical transmitter of claim 14, wherein the optical detector is configured to, when comparing the detected backscattered signal with a theoretical representation of the backscattered signal:
- fit a waveform of the detected backscattered signal to a waveform of the theoretical representation of the backscattered signal; and
- determining said at least one location of the backscattering and signal loss from a best fit.

16. An optical transmitter configured to transmit data over and monitor a fibre cable with a single optical frequency, the transmitter comprising:
- an optical source arrangement configured to generate at least a first optical carrier and a second optical carrier at a same optical frequency;
- a generator configured to generate an electromagnetic monitoring signal;
- a first modulator configured to modulate the first optical carrier with the generated electromagnetic monitoring signal to create an optical monitoring signal;
- a second modulator configured to modulate the second optical carrier with a generated electromagnetic data signal to create an optical data signal;
- a circulator configured to receive the optical monitoring signal on a first port and to forward the optical monitoring signal via a second port;
- a combiner configured to combine the optical monitoring signal received from the second port of the circulator and the optical data signal in orthogonal polarization modes, and to transmit the combined optical monitoring signal and the optical data signal over the fibre cable to be monitored, the combiner further being configured to receive the optical monitoring signal being backscattered from the fibre cable; wherein
the circulator further being configured to receive from the combiner, on the second port, the optical monitoring signal being backscattered from the fibre cable for transmission to a third port; the optical transmitter further comprising:
- an optical detector configured to receive the backscattered signal via the third port of the circulator for monitoring the fibre cable.

17. The optical transmitter of claim 16, further comprising:
- a selector configured to:
    - extract the backscattered signal from a signal received via the fibre cable for submission to the combiner; and to
    - extract, from the signal received via the fibre cable, a data signal submitted by a remote optical transmitter connected to the fibre cable, the optical transmitter further comprising:
        - a receiver configured to receive the extracted data submitted by the remote optical transmitter connected to the fibre cable.

18. A system of optical transmitters, each being configured to transmit data over a respective fibre cable, the system further being configured to monitor each respective fibre cable with a single optical frequency, the system comprising:
- a cable monitoring device comprising:
    - a tuneable optical source configured to generate a first optical carrier; and
    - a generator configured to generate an electromagnetic monitoring signal;
    - a modulator configured to modulate the first optical carrier with the generated electromagnetic monitoring signal to create an optical monitoring signal;
    - a circulator configured to receive the optical monitoring signal on a first port and to forward the optical monitoring signal via a second port, and further to receive the optical monitoring signal being backscattered from any of the fibre cables on the second port for transmission to a third port;
    - an optical detector configured to receive the backscattered signal via the third port of the circulator for monitoring the fibre cable; and
    - an optical switch configured to receive the optical monitoring signal via a second port of the circulator, and to forward the received optical monitoring signal to each of the optical transmitters, and further to receive the backscattered signal from each of the optical transmitters for transmission to the optical detector via the second and third port of the circulator;
- each optical transmitter comprising:
    - an optical source configured to generate a second optical carrier;
    - a modulator configured to modulate the second optical carrier with a generated electromagnetic data signal to create an optical data signal;
    - a combiner configured to receive, from the optical switch of the cable monitoring device, the optical monitoring signal, to combine the optical monitoring signal and the optical data signal in orthogonal polarization modes, to transmit the combined optical monitoring signal and the optical data signal over the fibre cable to be monitored, the combiner further being configured to receive the optical monitoring signal being backscattered from the fibre cable and forward the backscattered signal to the optical switch of the cable monitoring device.

19. The system of claim 18, each optical transmitter further comprising:
- a selector configured to:

extract the backscattered signal from a signal received via the fibre cable for submission to the combiner; and to extract, from the signal received via the fibre cable, a data signal submitted by a remote optical transmitter connected to the fibre cable, the optical transmitter further comprising:

a receiver configured to receive the extracted data submitted by the remote optical transmitter connected to the fibre cable.

20. The system of claim 18, wherein the electromagnetic monitoring signal is generated at a first frequency, each optical transmitter further comprising:

at least one generator configured to generate at least one electromagnetic data signal;

at least one frequency shifter configured to shift the frequency of the at least one electromagnetic data signal to a second frequency higher than the first frequency, wherein the frequency-shifted at least one electromagnetic data signal is utilized to modulate the second optical carrier to create an optical data signal.

21. The system of claim 20, wherein in case two or more electromagnetic data signals are generated and frequency-shifted at each optical transmitter, each optical transmitter comprises:

a combiner configured to combine the two or more frequency-shifted electromagnetic data signals, wherein the combined two or more frequency-shifted electromagnetic data signals is utilized to modulate the second optical carrier to create an optical data signal.

* * * * *